United States Patent Office 3,531,804
Patented Sept. 29, 1970

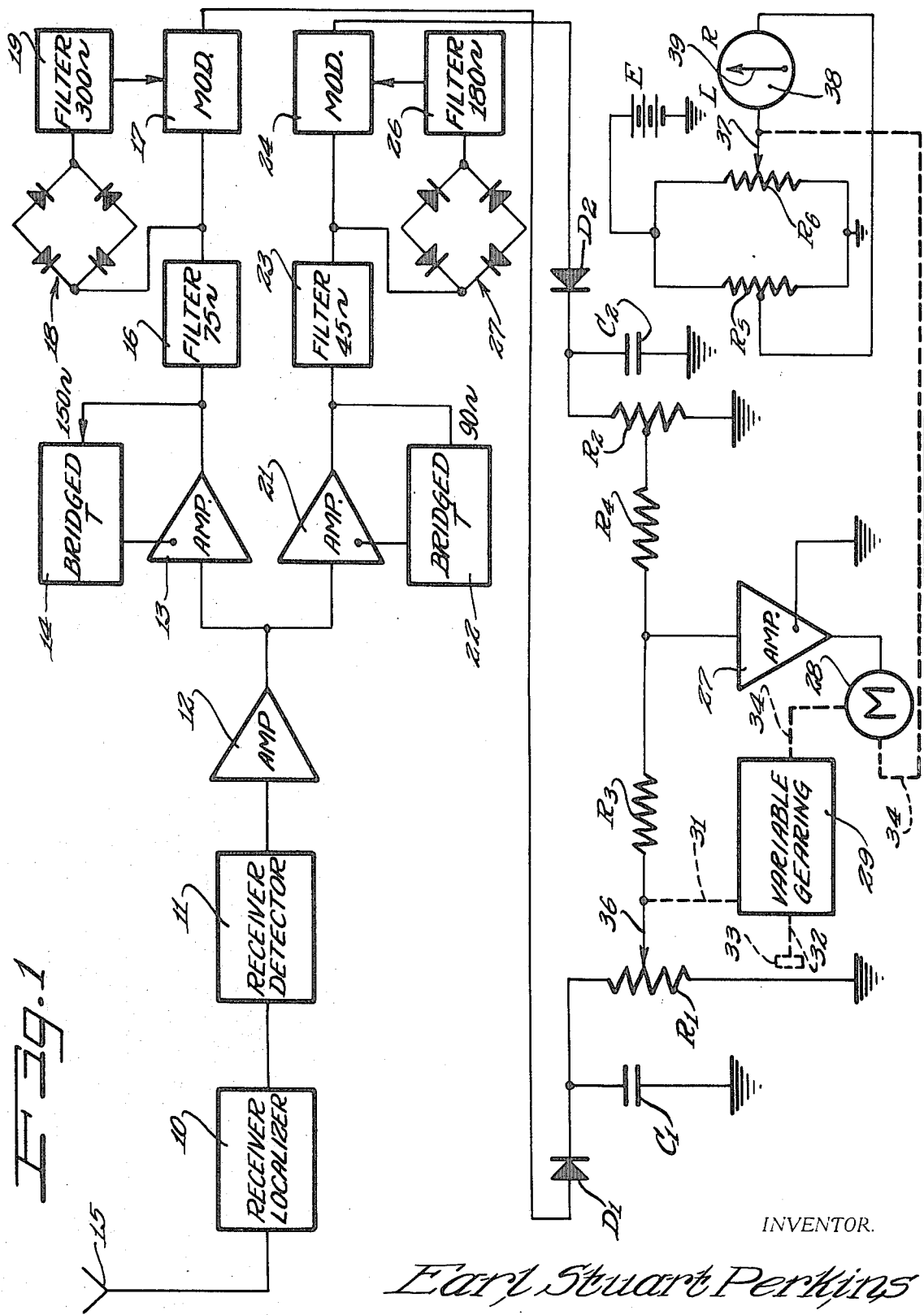

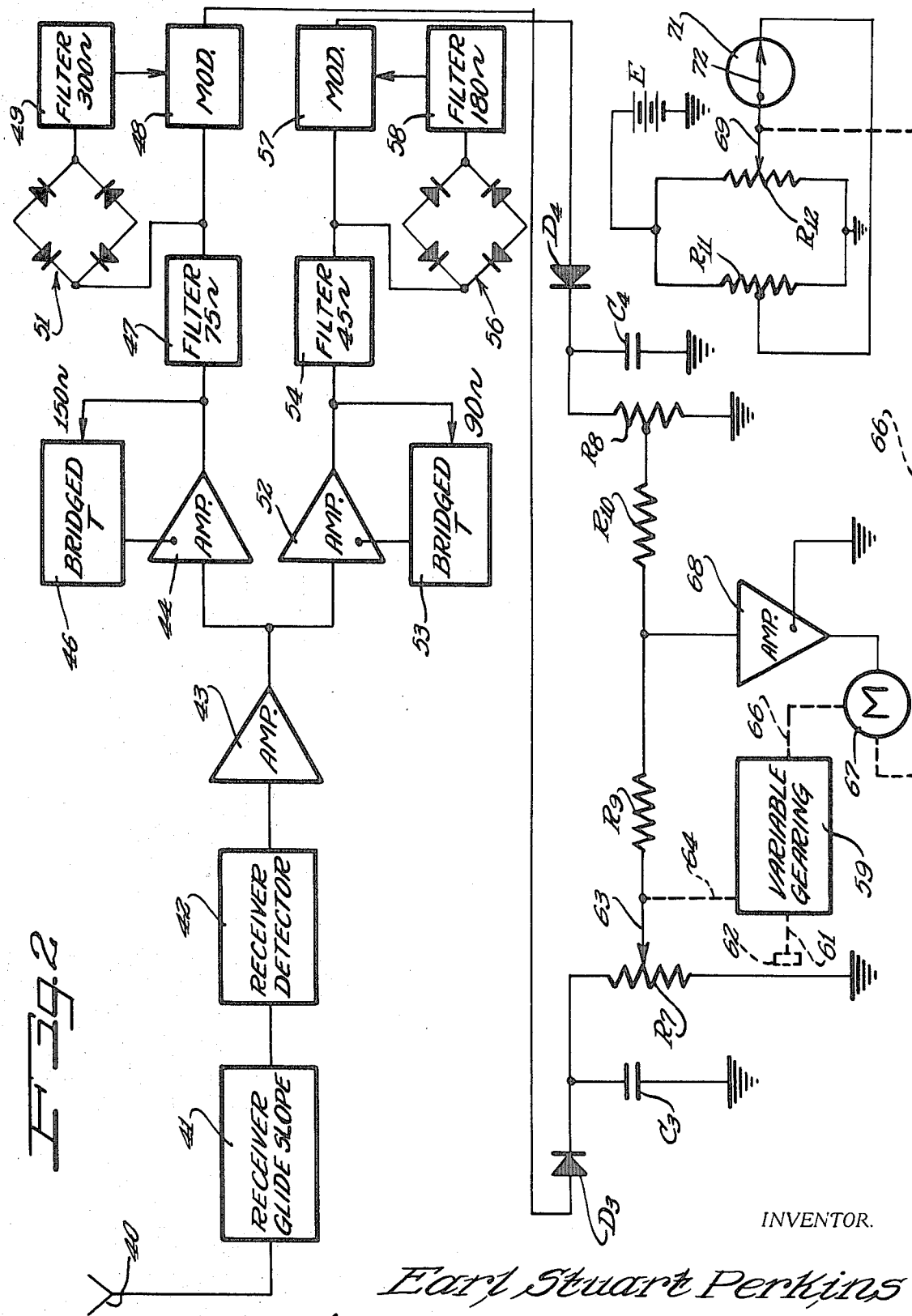

3,531,804
INSTRUMENT LANDING SYSTEMS
Earl Stuart Perkins, Oak Brook, Ill., assignor to Butler National Corporation, Minneapolis, Minn., a corporation of Delaware
Filed May 23, 1968, Ser. No. 731,456
Int. Cl. G01s 1/16
U.S. Cl. 343—108                                            5 Claims

ABSTRACT OF THE DISCLOSURE

An improved instrument landing system using localizer and glide slope in which responses to spurious frequencies that can give rise to errors are removed. Bridged T network filters are used in negative feedback loops for amplifiers to improve the accuracy of the system and a servo motor in a closed loop with variable gear ratio is used to improve the response of the system. The spurious frequencies are removed by passing the intelligence signal through a full wave rectifier and then through a filter which is tuned to block frequencies at twice the frequencies of the intelligence carrying signal and applying the output of this filter to a modulator into which the intelligence signal is fed to remove the undesired spurious frequencies.

BACKGROUND OF THE INVENTION

Field of the invention

This invention relates in general to aircraft navigation and, in particular, to instrument landing systems which use localizer for lateral control of the aircraft and glide slope for control in the vertical plane.

Description of the prior art

Prior instrument landing systems have been subject to error due to spurious frequencies such as noise and modulation which are superimposed on the position signals.

SUMMARY OF THE INVENTION

The present invention relates to an improved instrument landing system for use with localizer and glide slope in which position is obtained with a high degree of accuracy due to processing of the data from the localizer and glide slope receivers. The position signals are detected and passed through amplifiers which receive negative feedback from bridged T networks and are then processed to remove undesirable and error causing modulation components. A closed loop servo system with variable gearing in the position feedback receives the position signals. The output shaft of the servo motor also controls an output circuit comprising an indicator which indicates the aircraft's position.

Further objects, features and advantages will become apparent from the following description and claims when read in view of the drawings.

BRIEF DESCRIPTION OF THE DRAWINGS

FIG. 1 illustrates the invention embodied in a localizer system; and

FIG. 2 illustrates the invention embodied in a glide slope system.

DESCRIPTION OF THE PREFERRED EMBODIMENTS

FIG. 1 illustrates a localizer system which comprises an antenna 15 for receiving localizer signals transmitted from a ground station that indicate the lateral flight path it is desired to follow. A receiver 10 receives the localizer signal and supplies it to a detector 11 which detects the 150 and 90 hertz signals that carry the position data. These signals are supplied to an amplifier 12.

An amplifier 13 is adapted to pass 150 hertz signals by connecting a bridged T network 14 so that it receives the output of the amplifier 13 and supplies a negative feedback signal to the amplifier 13. The amplifier 13 and the bridged T network 14 are tuned so that the amplifier 13 passes the 150 hertz signal. A filter 16 is connected to the output of amplifier 13 and filters out 75 hertz signals. A modulator 17 receives the output of the filter 16.

A full wave detector 18 receives the output of the filter 16 and supplies an input to a filter 19 which removes 300 hertz signals and supplies an input to the modulator 17. The output of the modulator 17 is connected to a diode $D_1$.

An amplifier 21 also receives the output of the amplifier 12. It also receives a negative feedback signal from a bridged T circuit 22. The amplifier 21 and the bridged T circuit 22 are tuned to 90 hertz and the pass band of amplifier 21 peaks at 90 hertz.

A 45 hertz filter 23 receives the output of the amplifier 21 and removes signals at 45 hertz. A full wave rectifier 27 receives the output of the filter 23 and supplies an input to a filter 26 which removes signals that have a frequency of 180 hertz. A modulator 24 receives the output of the filter 26 and the output of the filter 23 and supplies an output to a diode $D_2$.

A resistor $R_2$ is connected from the diode $D_2$ to ground and is in parallel with a capacitor $C_2$. A resistor $R_1$ and a capacitor $C_1$ are connected in parallel between ground and the diode $D_1$. A resistor $R_4$ has one side connected to the mid-point of the resistor $R_2$ and its other side connected to a resistor $R_3$. The other side of resistor $R_3$ is connected to a wiper contact 36 which engages resistor $R_1$. A servo amplifier 27 is connected to the junction point between resistors $R_3$ and $R_4$ and provides an input to a servo motor 28. The output shaft 34 of the servo motor 28 is connected to a variable gearing transmission 29 which has an output shaft 31 that is connected to the wiper contact 36. A shaft 32 with a knob 33 controls the gear ratio between the shafts 34 and 31 as desired.

The output shaft 34 of the motor 28 is also connected to a wiper contact 37 that engages a resistor $R_6$. One end of resistor $R_6$ is connected to ground and the other end is connected to a voltage source E and a resistor $R_5$ which has its opposite end grounded. A left-right indicator 38 which has an indicator needle 39 has a control winding with one side connected to the midpoint of resistor $R_5$ and the other side connected to the wiper contact 37.

In operation, the receiver 10 and detector 11 detect the 90 and 150 hertz signals which determine the localizer path. At the output of the receiver detector the 150 hertz and 90 hertz signals and static will be present. At the output of the amplifier 13 the 150 hertz signal and any spurious modulation but without static will be present. At the output of the amplifier 21 the 90 hertz signal and any spurious modulation but without static will be present.

The filters 16 and 19 and modulator 17 remove any 75 hertz, 300 hertz and modulation error signals. Thus, the signal supplied to the input of the output circuit through diode $D_1$ is a corrected localizer signal which is much more accurate than available in prior art systems.

The 45 hertz filter 23, the 180 hertz filter 26 and the modulator 24 correct the 90 hertz signal which is supplied to the diode $D_2$. Thus, the control signals supplied to the diodes $D_1$ and $D_2$ are much more accurate than those available in prior art sytems.

The motor 28 and variable gearing 29, which controls the wiper contact 36, provides a closed loop servo system.

The variable gearing ratio 29 allows the response of the servo system to be adjusted with the speed of the aircraft. Since the speed of an aircraft is held fairly constant, the knob 33 allows a gear ratio to be selected which regulates the response of the servo system so that fluctuations higher than the actual speed of the aircraft will not introduce errors into the system.

The gear ratio may be different when the localizer beam has not been intercepted than when the beam has been intercepted. The rate of change of the localizer signal would be less once the beam has been intercepted and the aircraft is flying down the beam and the response of the system may be adjusted for this condition by varying the gearing ratio with knob 33. It will be realized that the gearing ratio may be controlled by a suitable relay, if desired.

The output shaft 34 also controls the position of the wiper contact 37 which drives the left-right pointer 39. The indicator 38 may be mounted on the instrument panel of the aircraft and would be visible to the pilot. Alternatively, the output of the wiper contact 37 might be supplied to an automatic pilot or flight director system for use in automatic control of the aircraft.

FIG. 2 illustrates the invention in the glide slope system. The antenna 40 is connected to a glide slope receiver 41 which has a detector 42 for detecting the 90 and 150 hertz signals indicative of the glide slope. An amplifier 43 receives the output of the detector 42. An amplifier 44 receives the output of amplifier 43 and a negative feedback signal from a bridged T circuit 46. The amplifier 44 and the bridged T circuit 46 are tuned to pass 150 hertz signals.

A 75 hertz filter 47 is connected to the output of the amplifier 44 and removes 75 hertz signals from the output of the amplifier 44. A full wave rectifier 51 receives the output of filter 47 and supplies an input to a 300 hertz filter 49 which removes 300 hertz signals. A modulator 48 receives the outputs of the filters 47 and 49 and supplies an input to diode $D_3$.

An amplifier 52 receives an output of amplifier 43 and receives an input from a bridge T circuit 53 which is connected to supply a negative feedback signal to the amplifier 52. The amplifier 52 and the bridged T circuit 53 are tuned to 90 hertz.

A filter 54 is tuned to remove 45 hertz signals from the output of the amplifier 52 and supplies an input to the full wave rectifier 56. A filter 58 tuned to remove signals at 180 hertz receives the output of the full wave rectifier 56 and supplies an input to the modulator 57. Filter 54 also supplies an input to the modulator 57 and the modulator 57 supplies an input to the diode $D_4$.

A capacitor $C_3$ and resistor $R_7$ are connected in parallel between ground and the diode $D_3$. A wiper contact 63 engages the resistor $R_7$ and is connected to one end of a resistor $R_9$, which has its other end conected to a resistor $R_{10}$. The other side of the resistor $R_{10}$ is connected to the midpoint of a resistor $R_8$. The resistor $R_8$ and a capacitor $C_4$ are connected in parallel between ground and the diode $D_4$.

An amplifier 68 receives an input from the junction point between resistors $R_9$ and $R_{10}$ and supplies an output to a motor 67. The output shaft 66 of motor 67 is connected to a variable gearing transmission 59 which has an output shaft 64 that controls the position of the wiper contact 63. The gear ratio of the transmission 59 may be controlled by shaft 61 which has a knob 62.

The output shaft 66 of the motor 67 is also connected to a glide slope output circuit comprising a glide slope indicator 71 which has an up and down indicator needle 72. One input to the needle 72 is connected to the midpoint of a resistor $R_{11}$ which has one end connected to ground and its other end connected to a bias source E and to a resistor $R_{12}$. The second end of the resistor $R_{12}$ is connected to ground. A variable wiper contact 69 engages resistor $R_{12}$ and supplies an input to the indicator 71. The output shaft 66 of motor 67 controls the position of the wiper contact 69.

The glide slope system of FIG. 2 operates in the same manner as the localizer system of FIG. 1 and the indicator 72 produces a corrected output which is much more accurate than available with prior systems.

It is to be realized that the output supplied to the indicator 72 may be connected to an auto-pilot or flight director system for automatic control of the aircraft.

The principles of the invention explained in connection with the specific exemplifications thereon will suggest many other applications and modifications of the same. It is accordingly desired that in construing the breadth of the appended claims they shall not be limited to the specific details shown and described in connection with the exemplifications thereof.

I claim as my invention:

1. A navigation system for detecting a zone of equal energy from a pair of radiant energy signals of different frequencies produced by a transmitter on the ground comprising:
   a receiver for detecting said pair of signals,
   a pair of separating channels connected to the output of said receiver and tuned respectively to select the frequencies of said pair of radiant energy signals,
   a comparing circuit receiving the outputs of said pair of separating channels,
   an implementation means connected to said comparing circuit,
   each of said separating channels including first filtering means for removing signals at one-half the frequencies of the radiant energy signals, and
   each of said separating channels each including second filtering means comprising a modulator in series with the signal path through said channels,
   a rectifier connected to the input of said modulator and receiving an input from said signal path ahead of said modulator, and
   a second blocking filter tuned to block signals at twice the desired frequency connected to the rectifier and supplying an input to said modulator.

2. A navigation system according to claim 1 wherein each of said first filtering means comprises a blocking filter tuned to block signals at one-half the desired frequency.

3. A navigation system according to claim 1 wherein each of said separating channels includes an amplifier which receives negative feed-back from a circuit having a variable frequency response and comprising a bridged-T circuit tuned to the frequency of the desired signal so that the amplifier serves as a filter to pass the frequency of the desired signal.

4. A navigation system according to claim 1 wherein said zone of equal energy determines a line of position in a horizontal plane.

5. A navigation system according to claim 1 wherein said zone of equal energy determines a line of position in a vertical plane.

References Cited

UNITED STATES PATENTS

| | | | |
|---|---|---|---|
| 2,264,063 | 11/1941 | Bond | 343—109 |
| 2,830,453 | 4/1958 | Jones | 324—99 |

OTHER REFERENCES

P. H. Hammond: Feedback Theory and Its Applications, 1958, pp. 153–154.

RODNEY D. BENNETT, Primary Examiner

T. H. TUBBESING, Assistant Examiner

U.S. Cl. X.R.

324—99; 343—109